April 30, 1946.   G. C. CHASE   2,399,170
CALCULATING MACHINE
Filed Dec. 27, 1940   9 Sheets-Sheet 1

Fig.1

INVENTOR
George C. Chase
BY
ATTORNEY

April 30, 1946. G. C. CHASE 2,399,170
CALCULATING MACHINE
Filed Dec. 27, 1940 9 Sheets-Sheet 4

INVENTOR
George C. Chase
BY
Stuart Hill
ATTORNEY

April 30, 1946.　　　　G. C. CHASE　　　　2,399,170
CALCULATING MACHINE
Filed Dec. 27, 1940　　　9 Sheets-Sheet 7

INVENTOR
George C. Chase
BY Stuart Wild
ATTORNEY

April 30, 1946.        G. C. CHASE        2,399,170
CALCULATING MACHINE
Filed Dec. 27, 1940        9 Sheets-Sheet 8

INVENTOR
George C. Chase
BY
Stuart Wilde
ATTORNEY

Patented Apr. 30, 1946

2,399,170

UNITED STATES PATENT OFFICE 2,399,170

CALCULATING MACHINE

George C. Chase, South Orange, N. J., assignor to Monroe Calculating Machine Company, Orange, N. J., a corporation of Delaware Application December 27, 1940, Serial No. 371,932

17 Claims. (Cl. 235—60)

The invention has relation to calculating machines and more particularly to means for entering, storing and/or transferring values from one unit of the machine to another.

The invention consists in the novel construction and combination of parts, as set forth in the appended claims.

Value entering means

U. S. Patent No. 2,233,912, issued to applicant on March 4, 1941, shows value entering means whereby multi-cycle rotary actuating mechanism may be set to register digital values in an accumulator.

The machine of the present application is equipped with multi-cycle rotary actuating mechanism and single cycle reciprocatory actuating mechanism, and the value entering means must serve to control digital actuation in each of these actuators.

The value entering means for setting the rotary multi-cycle actuators of this application are substantially similar to the value entering means of said patent. Values set in the keyboard 18 (Figs. 1 and 2) are set into the differential product register actuators semi-complementally, so that the values 1 to 4 will be registered normally and the values 5 to 9 will be registered complementally. For instance, 3 would be added as +3, while 7 would be added as +10 —3.

Figure 4:
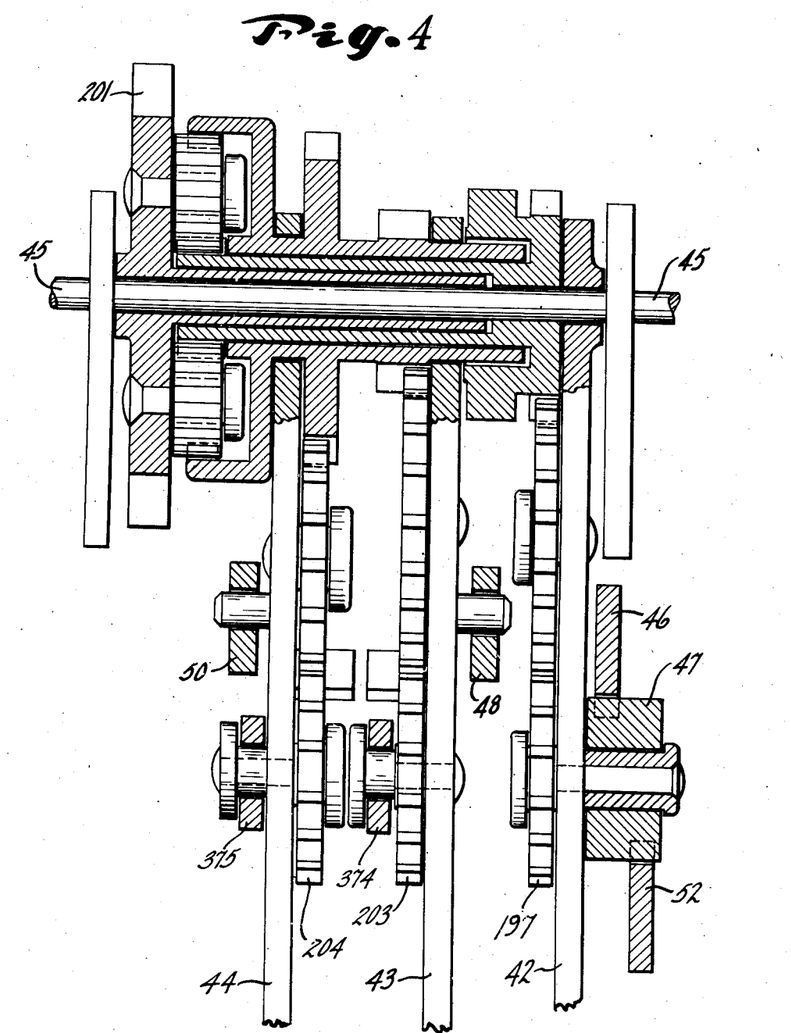
Fig. 4 is a vertical section through one unit of the differential actuator mechanism drawn to a horizontal scale which is proportionately enlarged.

Each unit of the differential actuator consists of a planetary gear train having an output gear 201 (Figs. 2 and 4) and two input legs, adapted to be connected, through three trains of pendant gearing alternatively with one or the other of a pair of oppositely rotating drive pinions 198, 199, through which subtractive and additive movements respectively will be imparted to the input legs of the planetary.

The three trains of pendant gearing 197, 203 and 204 are supported on arms 42, 43 and 44, pivotally mounted for movement about the actuator shaft 45, the gear ratios of the planetary train and of the pendant trains being such that during each cycle of operation of the machine train 197 may impart one step of movement to output gear 201 and the corresponding numeral wheel of the product register 473; train 203 may impart four steps of movement, and train 204 two steps of movement.

The trains 197, 203 and 204 are engaged singly or in combination with the pinions 198, 199, and the different partial values are merged by the planetary gearing, the sum or difference being transmitted to the output gears 201.

The arms 42, 43, 44 are adjusted in accordance with the depression of keys 18 by means of slides having cam portions underlying the key stems, each slide being connected at its rearward end with one of said arms. Arm 43 is movable in either direction by a slide 48 having a value of ±4; arm 44 is adjusted forwardly or rearwardly by a slide 50 having a value of ±2, and arm 42 is moved forwardly by a slide 46 having a value of —1, or rearwardly by a slide 52, cooperating with a key bank of lower denominational order, and having a value of +1. Slides 46 and 52 are provided with rack teeth engaging a pinion 47, mounted upon the arm 42, so that movement of slide 52 will either engage pendant train 197 with pinion 199, to add 1, or, if slide 46 has also been set, the setting of slide 52 will disengage gear train 197 from pinion 198, cancelling the registration of −1.

Figures 2, 3:
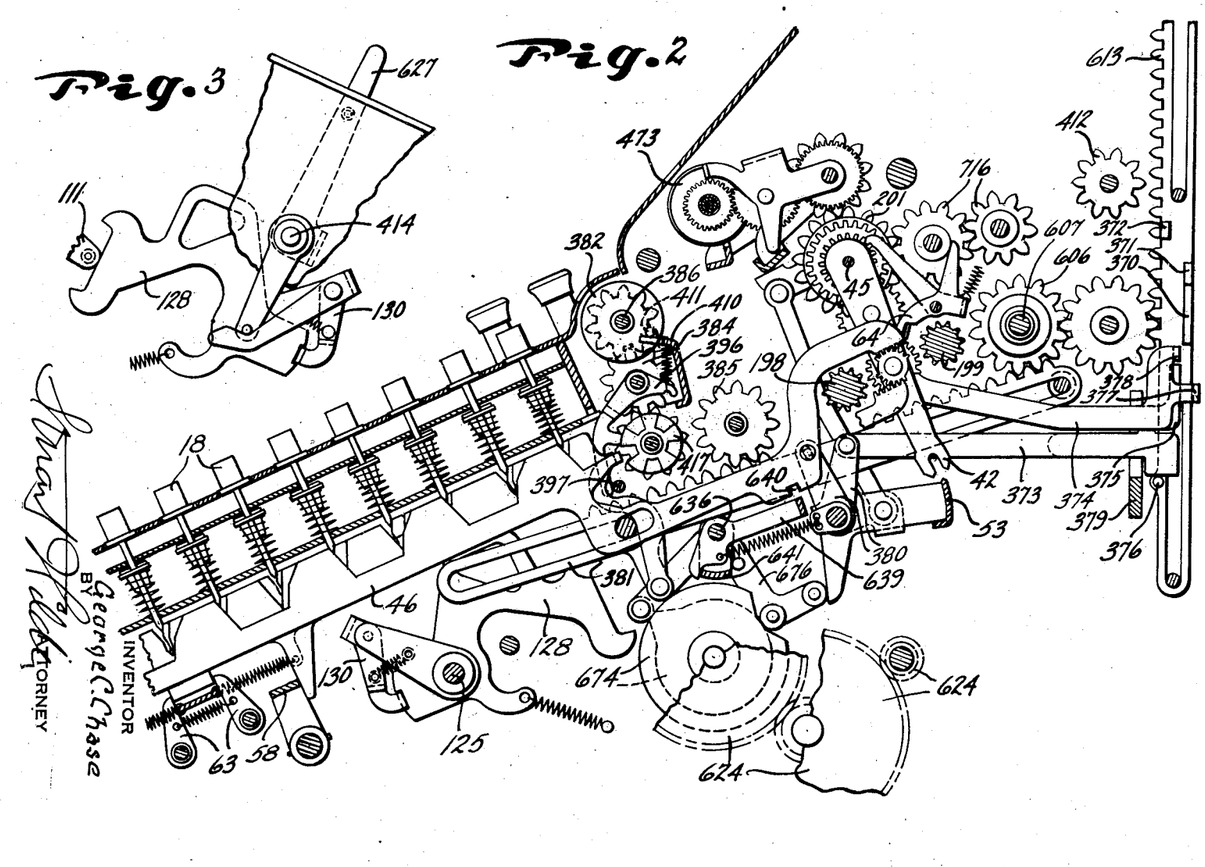
Fig. 2 is a vertical section through the keyboard, storage and registering mechanism.
Fig. 3 is a detail left side elevation of the operation controlling lever and associated parts.

Slides 46 and 52 are set by the keys against the tension of appropriate springs, while slides 48 and 50 are settable in either direction against the tension of a spring centralizer 63 (Fig. 2). The slides 46, 48, 50 and 52 are similar to the slides bearing the same numerals in application Serial No. 366,261, excepting for such modifications as are noted hereinafter, these modifications being shown in Figs. 2 and 14 to 19. The keys are designed to set the pendant gear trains part way toward the pinions 198 or 199, the parts being brought into full meshing position, upon operation of the calculating and/or the listing mechanism by means of the bail 53, as set forth in the co-pending application Serial No. 366,261 and Patent No. 2,233,912.

The further novel arrangement of this value entering means, whereby it may control digital value actuation of the single cycle reciprocatory actuators, will be described under the heading, "Setting of the lister or transfer racks."

*Operating means*

Figures 5, 6:
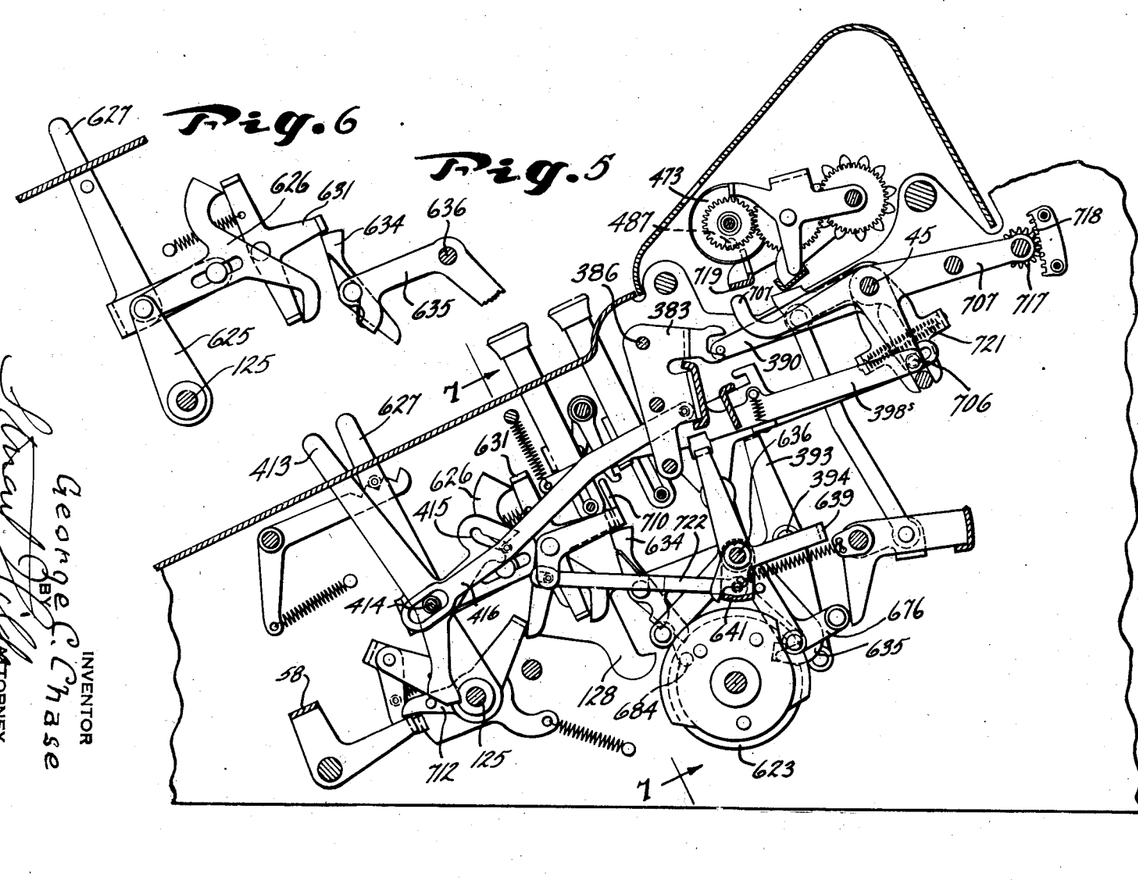
Fig. 5 is a vertical section taken through the controlling mechanism on the left hand side of the machine.
Fig. 6 is a detail right side elevation of the operation controlling lever and associated parts.

The oppositely rotated pinions 198 and 199 are driven one third of a revolution, forwardly or reversely, during each cycle of machine operation by gearing connection with an electric motor, as disclosed in Patent No. 2,233,912, hereinbefore referred to, and in United States Patent No. 1,566,650, issued to the present applicant on December 22, 1925, wherein a planetary gear clutching and reversing mechanism is shown as interposed on the drive train, one end of the three-position clutch lever 111 controlling said mechanism being indicated in Fig. 3. Clutch lever 111 is rocked from its central, neutral position in one direction to effect additive registrations in the register 473, and in the other direction to effect subtractive registrations. This rocking of lever 111 is controlled from plus and minus bars 120, 122 (Fig. 1) which serve to rock a shaft 125 (Figs. 2, 5 and 6) alternatively in one or the other direction, carrying therewith a setting lever 128 having shoulders engaging a stud of clutch lever 111. The clutch being engaged for additive or subtractive registration, the machine will continue to operate until setting lever 128 is released, whereupon known stopping mechanism will be operated at the end of the current cycle of operation of the machine to centralize clutch lever 111 and bring the differential actuators to rest in full cycle position.

An independent drive is effected from the electric motor to series of racks 381 and 613, these racks being utilized to transfer values to and from the value storage wheels hereinafter described, and also if desired to set lister type to proper printing position.

Figure 7:
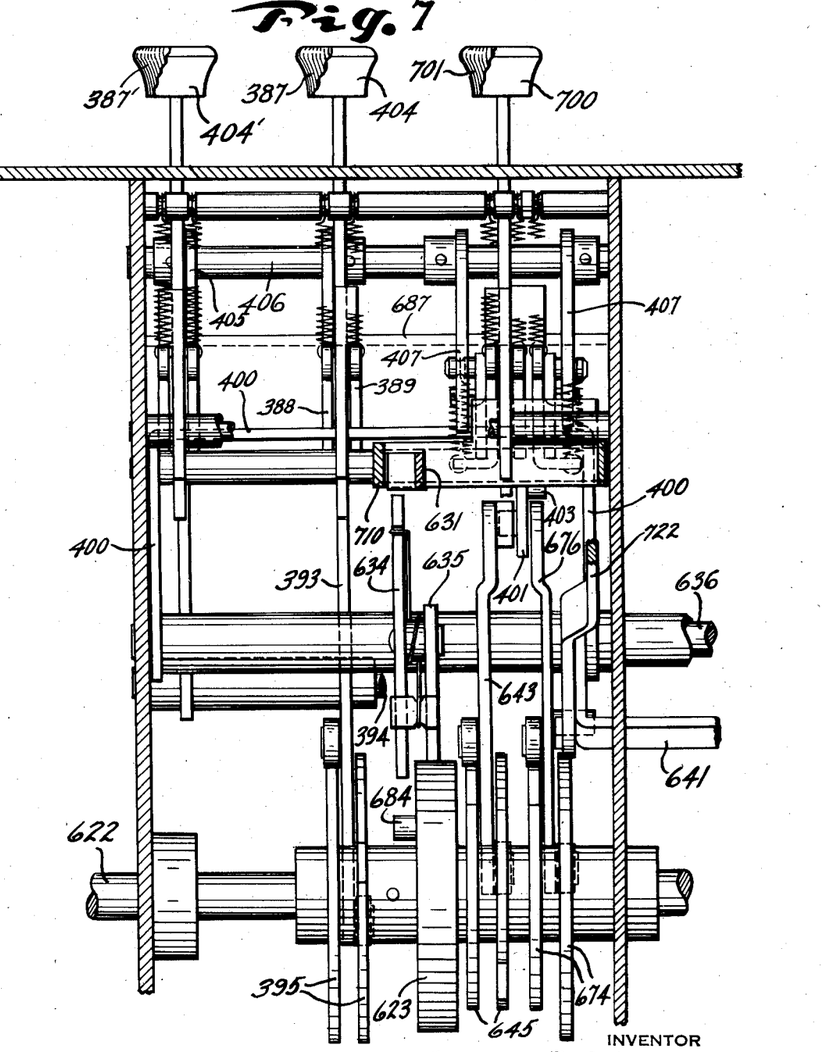
Fig. 7 is a section taken on line 7—7 of Fig. 5.
Figure 8:
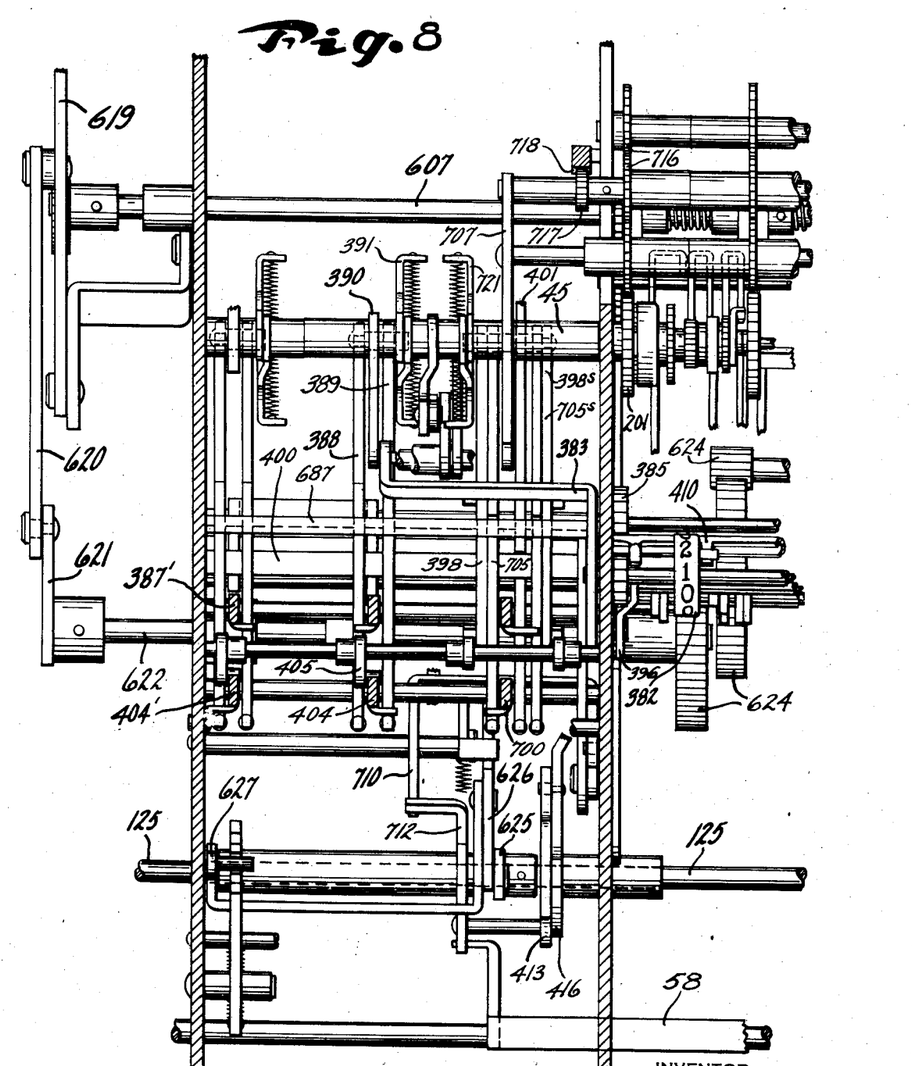
Fig. 8 is a horizontal section showing the total, sub-total and transfer key mechanism.

The racks 613 are driven in the manner disclosed in applicant's co-pending application Serial No. 366,261, filed November 19, 1940, through a one cycle clutch 623 (Figs. 5 and 7), connected with the electric motor through gearing 624, as shown in Figs. 2 and 8. The driven element of clutch 623 has shaft connection 622 with a crank arm 621 (Fig. 8) which in turn has link connection 620 with a rack 619 meshing with a pinion fixed upon a shaft 607 with which a set of pinions 606 (Fig. 2) are frictionally connected. Pinions 606 have intermediate gear connection with the racks 613, so that upon engagement of clutch 623 these racks will be yieldably reciprocated, the extent of movement of each rack being determined by certain limiting devices hereinafter described.

Application Serial No. 366,261 discloses listing mechanism operable to print the factors and answers of any problem computed in the calculating mechanism of the machine. Similar listing mechanism may be provided herein but, as will be seen, the racks 613 operate in conjunction with racks 381 to transport values to and from the storage wheels, and the printing means proper may be omitted. When listing mechanism is provided, the racks 613 are connected by intermediate gearing with type bars 503 (Fig. 1) in known manner.

Clutch 623 is normally held in disengaged position by contact of a clutch element with the detent 635 (Figs. 5 and 6), detent 635 being tripped by connections from the plus and minus bars as follows:

Shaft 125 is provided with an arm 625, having pivotal connection with a push-pull lever 626. Rocking movement of shaft 125 in either direction will bring push-pull lever 626 into contact with one of two opposed arms of a three-armed lever 631, the third arm of this lever normally lying above a trigger 634, mounted on clutch detent 635, whereby movement of lever 631 will depress trigger 634 and rock detent 635 to effect engagement of the clutch. At the end of a cycle of operation, a pin 684 of clutch 623 will contact with trigger 634 and release the same from the arm of lever 631. Thereupon, detent 635 will be drawn by spring means into position to release the clutch and bring racks 613 to rest.

Operation control lever 627 (Figs. 3, 5 and 6) is adapted to be set into one of three positions, to control calculating and listing, calculating only or listing only. The middle position of lever 627 (which is the position shown in all three figures) provides for calculation and listing, all of the controls operating as previously described. Lever 627 being set toward the front of the machine, the connections to the listing clutch will be broken, and the machine will operate to calculate only. To this end, push-pull lever 626 has pin and slot connection with a rearwardly extending arm of lever 627, and as said lever is moved to its forward position the contacting portion of the push-pull lever will be rocked so that upon operation of shaft 125 the three-armed lever 631 will not lie within the paths of movement of said portions. The contacting portions of push-pull lever 626 are extended, so that upon setting of lever 627 into its rearward position they will still be in engaging position with relation to lever 631 and the clutch detent 635 will be operated upon depression of the plus and minus bar. However, in this rearward position of lever 627 a lower arm thereof (Fig. 3) will be brought into contact with a coupling 130, connecting shaft 125 with setting lever 128, and said coupling will be released, so that clutch lever 111 will not be operated upon depression of said plus minus bars.

*Setting of the lister or transfer racks*

The present disclosure sets forth means whereby a value set into the keyboard may be simultaneously used in a calculation and listed and/or installed in an auxiliary register of the machine. It further provides that a value installed in the storage wheels 382 may be used in lieu of a keyboard value, to simultaneously control a calculating operation and a listing and/or a transfer of said value to some otherwise inactive register of the machine.

As in application Serial No. 366,261, a value set into the keyboard may be used to control independently driven calculating and listing mechanism, the operation of which is initiated by a single operation key. In that application, slides (corresponding to the present slides 46, 48, 50 and 52) were set by the keys as a differential value control for calculation, and racks were yieldably driven against the stems of the depressed keys to provide the differential value listing control. In order to provide that these independently driven trains may be controlled either from the keyboard or from the storage wheels 382, the racks 381 of the present application have been substituted for the listing racks of the application Serial No. 366,261, these new racks being subject to a differential value control exercised by the slides 46, 48 and 50, which slides (together with the slide 52) are settable from the storage wheels to represent a value standing in said wheels, as they would be set to represent the same value if it were set in the keyboard.

The racks 381 are entrained with the racks 613, as were the listing racks of the previous application, so these racks move in unison in response to the yieldable drive. Provision is also made whereby the digital values which are set complementally into the slides 46, 48 and 50 serve to control normal value movements of the racks 381 and 613, and whereby partial digit values represented in the setting of said slides may be summarized to determine normal whole digit value movement of said racks. The slide 52 plays no part in the control of the racks, as will be seen.

To effect this control, the lugs 370, 371 and 372 (Figs. 2 and 13) are formed on the racks 613, and stop links 373, 374 and 375 are adapted to be set by the slides 46, 48 and 50 respectively. Link 373 has bell crank connection 380 with slide 46, and underlies both of the links 374 and 375. Normally the links are held in raised position by engagement of a pin 376 of rack 613 with link 373. Link 374 has pivotal connection with the pendant gear arm 43 and link 375 has similar connection with arm 44. Link 374 is provided with stop lugs 377 and 378, normally lying out of the paths of movement of the lugs of rack 613, while link 375 has an upturned end, also normally lying out of the paths of movement of said lugs.

It will be recalled that slide 48 has a value of ±4, and when this slide is set to its rearward position lug 378 will be moved to position beneath lug 371 of rack 613, and when said rack is driven downwardly the lugs will contact and, assuming that link 373 lies in its normal position, the links 373 and 374 will drop or will be driven downwardly until link 373 contacts with the upper surface of a bar 379, thus limiting rack 613 to a four step movement. Forward setting of slide 48 and link 374 will bring lug 377 of the link beneath lug 371 of the rack, providing for six steps of movement of the rack. Setting of slide 50 in the rearward direction will carry the stop end of link 375 beneath lug 370 of the rack, providing for two steps of movement, while forward setting of slide 50 will move the stop end of link 375 beneath lug 372, providing for eight steps of movement of the rack. Movement of slide 46 (which is set only forwardly) will bring a depending shoulder of link 373 into position above bar 379, preventing any appreciable downward movement of the three links, and thereby providing for one less step of movement of the racks than when link 373 is in its normal rearward position.

Therefore, the values which are set semi-complementally in the differential actuators are set normally (that is, by graduated movements in a single direction) into the racks 613, in accordance with the following table:

| Slides | Link | Lugs | Link |
| --- | --- | --- | --- |
| 1= +2−1 | 375 rear | 370 | 373 forward over 379. |
| 2= +2 | 375 rear | 370 | |
| 3= +4−1 | 374 rear | 378, 371 | Do. |
| 4= +4 | 374 rear | 378, 371 | |
| 5=+10−4−1 | 374 forward | 377, 371 | Do. |
| 6=+10−4 | 374 forward | 377, 371 | |
| 7=+10−2−1 | 375 forward | 372 | Do. |
| 8=+10−2 | 375 forward | 372 | |
| 9=+10−1 | rack 613 moves to its limit. | | |

It is to be particularly noted that in the conversion of normal values from the keyboard or from the storage wheels 382 into short cut values suitable for the control of register wheels, the four slides 46, 48, 50 and 52 are essential, but that in converting back for normal registration, but three of these slides are necessary to the control. Slide 52 serves only to set a unit in the next higher order actuator, to nullify the effect of a tens transfer in register 473 whenever the registration is complemental.

Column latches

In orders in which no slides are set movement of the racks 381 and 613 is prevented by column latches 639 (Figs. 2 and 5), pivotally mounted on shaft 636 and spring urged against the slides 46, 48 and 50.

When the one-cycle clutch 623 stands in full cycle position, the column latches will be held free of the slides by means of a bail 641, engaged by a pin in the rocker 676 positioned by the cams 674, fast upon the driven element of the clutch. Upon operation of this driven element the column latches will be allowed to move into engagement with the slides, engaging notches 640 of the slides 46, 48 and 50 when none of these slides have been moved out of their normal positions. Movement of a column latch 639 into the notches 640 will also engage said latch with a similar notch formed in the rack 381. Therefore, in the columns in which no value has been set the racks 381, the frictionally driven pinions 606 and racks 613 will be held against movement. In columns in which values have been set one or more of the slides 46, 48, 50 will be displaced and the notch or notches 640 of such slides will not register with the latch 639. Therefore, the latch will rest against the slides and will thereby be prevented from engaging the notch of rack 381. The surface of the slides engaged by the column latches is lower than the corresponding surface of racks 381, so that the racks may move freely without frictional contact with the latch. The lower edge of slide 52 lies above the path of movement of the latch and consequently, slide 52 has no effect on the latch.

In total taking the clutch 623 is engaged and cams 674 are driven, but all of the column latches are held out of engaging position by means of a link 722 (Fig. 5) connecting bail 641 with a bail 710 operated by the total and sub-total keys.

Values to storage from keyboard

Each of the storage wheels comprises a cylinder 382 (Fig. 2) on which the digits 0 to 9 are marked, these indications being readable through openings in the casing of the machine, the cylinder being fast with a ten-toothed gear. A frame consisting of a pair of arms 383 (Fig. 3), connected by a plate 410, is pivotally supported upon the shaft 386 of the wheels 382, these arms being also connected by shafts forming supports for a series of pendant gear trains 384, one gear of each train meshing with the related storage wheel gear. The frame may be rocked in either direction, movement toward the rear of the machine, from the normal position illustrated in Fig. 2, serving to mesh a gear of each pendant train with a related intermediate gear 385 which meshes with a rack 381.

Gears 384 are meshed with gears 385 under control of a "To storage" key 387 (Figs. 1, 7 and 9), so that depressed condition of said key during operation of the one cycle clutch 623 by the depression of the plus bar, the minus bar or any other operation key acting upon said clutch will serve to transfer values to the storage wheels. In order to simplify the present disclosure no means is shown for holding key 387 depressed during an operation, it being assumed that finger pressure will be maintained on the key.

Figures 9, 10, 11, 12, 13:
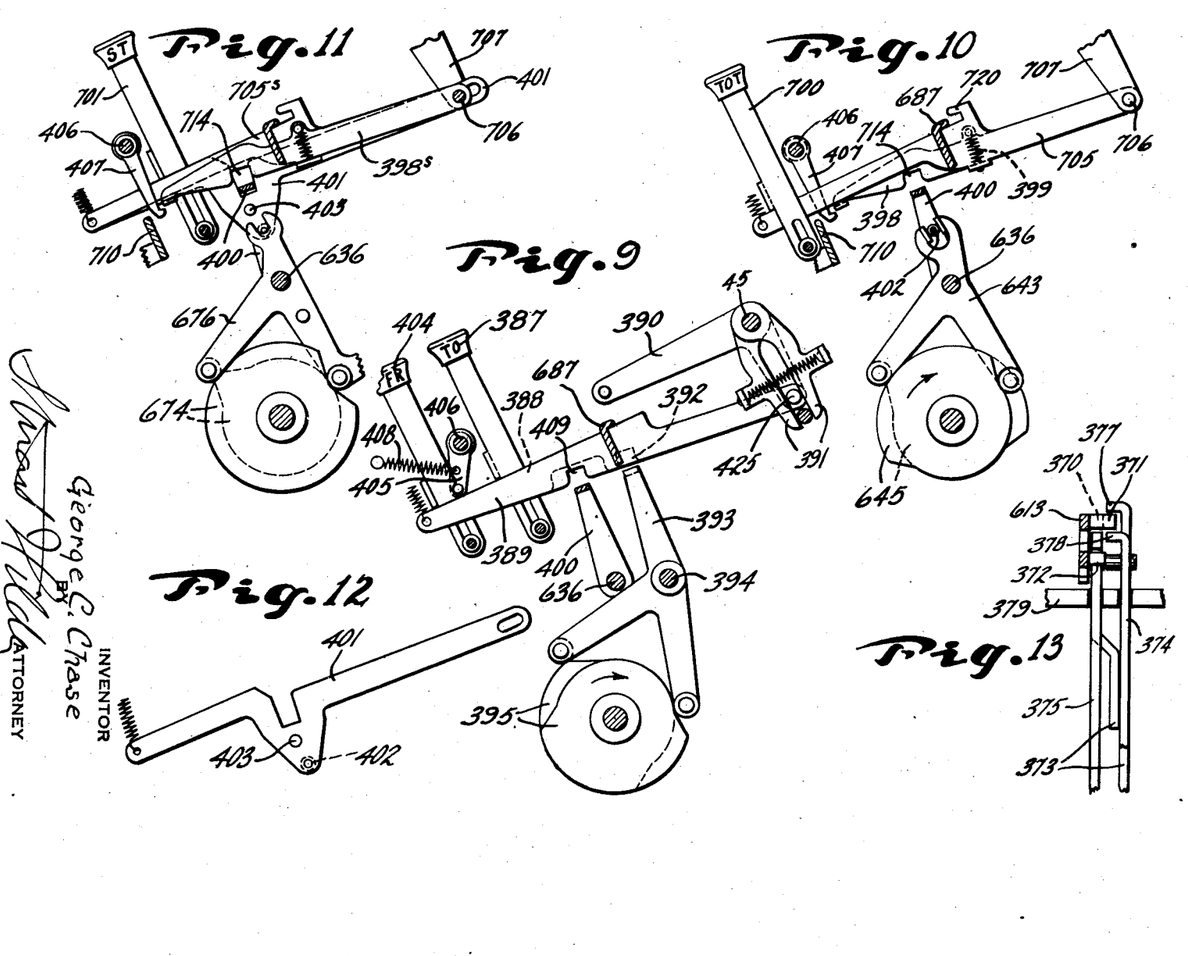
Fig. 9 is a detail right side elevation of the transfer key mechanism.
Fig. 10 is a similar view of the total key mechanism.
Fig. 11 is a similar view of the sub-total key mechanism.
Fig. 12 is a detail right side elevation of a coupling lever.
Fig. 13 is a detail horizontal section of the stop links shown in Fig. 2.
Figures 14, 15, 16:
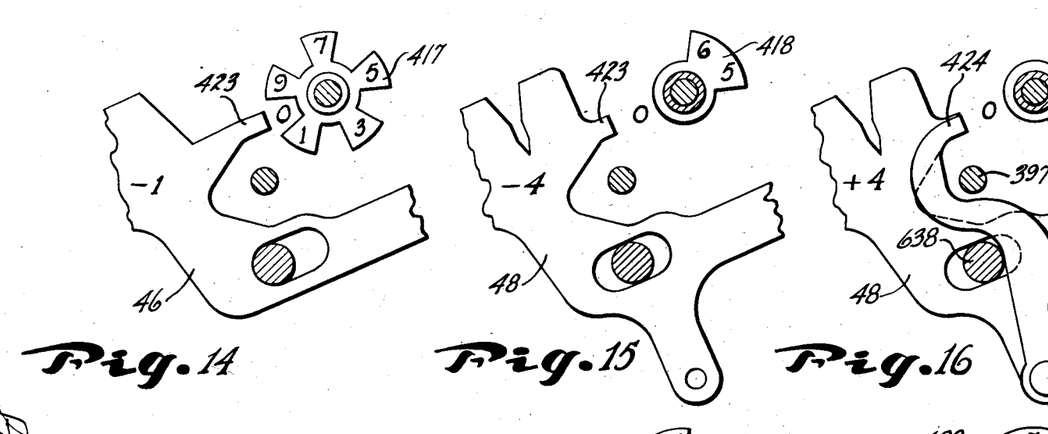
Figs. 14 to 19 are detail right side elevations of the stepped disks related to the storage wheels, and associated parts.
Figure 17:
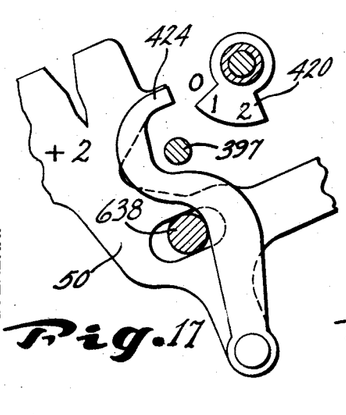
Figure 18:
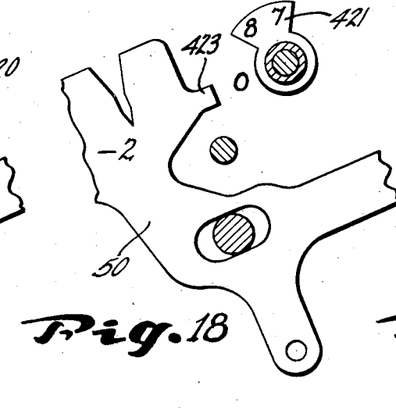
Figure 19:
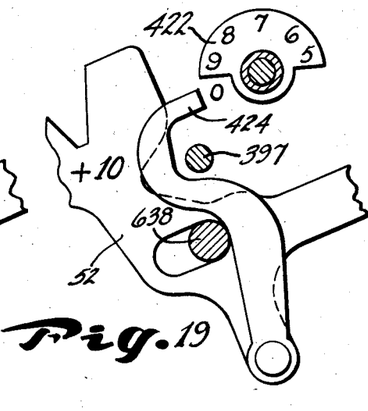

Key 387 is provided with a lug overlying a lever 388 (Fig. 8), coinciding in general outline with the "From storage" lever 389, shown in Fig. 9, but varying therefrom according to the dotted lines. These two levers are pivoted at 425 upon a bell crank lever 390 (Figs. 5, 8 and 9), supported upon the actuator shaft 45. Lever 390 is normally positioned by a spring centralizer 391 and lever 388 is held against a stop bar 687 by a suitable spring. Upon depression of key 387 a notch 392 of lever 388 engages a lug of a rocker 393, pivoted upon the fixed shaft 394. Rocker 393 has a forked lower end provided with rollers engaging a pair of cams 395 fixed upon the driven member of the clutch 623. These cams provide that the rocker will remain at rest during approximately the first half revolution of the clutch, during which time the racks 381 will be driven rearwardly and the racks 613 downwardly by the frictionally driven pinions 606, subject to control of the stop links 373, 374 and 375, set by the depressed keys 18. As the clutch passes through mid cycle position, and while the lister drive is passing through dead center, rocker 393 is moved, thrusting storage lever 388 forwardly and rocking bell crank lever 390, thereby rocking the arms 383 rearwardly from the position shown in Fig. 5, by means of a pin fixed in the bell crank lever and located between opposed jaws of one of said arms. This rocks the pendant gear frame and engages the gears 384 with the intermediate gears 385, holding these gears in engagement during the last half of the cycle of clutch 623, the movement of racks 381 back to their normal position serving to enter the value into the storage wheels.

In the normal disengaged position of the storage wheel trains, the teeth of gears 384 are engaged by spring detents 396 (Fig. 2) but, as gears 384 are swung into mesh with gears 385 the detents will be held by engagement with a stop rod 397, and the gear trains will be freed from the detents.

By setting the control lever 627 into "calculate and list" or into "list only" position, and operating the machine with key 387 depressed, values used in any calculation may be set in the storage wheels, or a value set in the keyboard may be stored without registration upon the product register 473.

*Values transferred to storage*

In order to store values from any source other than the keyboard, it is necessary that the keyboard and actuator settling slides be cleared, in order that the stop links 374, 375 shall not be set to interfere with the free movement of the racks 613 and 381. Total and sub-total keys usually provide for the clearing of the keyboard, as well as for operating the listing racks in accordance with an accumulated value, and advantage is taken of this by providing for their use as motor keys in transferring values from the product register to the storage wheels, the operations being controlled by a depressed "To storage" key.

Upon depression of the total key 700 (Figs. 8 and 10) a lug thereof will depress the lever 705, normally held against the bar 687 by a spring, the lever in turn depressing the bail 710 (Figs. 5, 10 and 11), lying above the trigger 634, so that upon operation of the parts clutch 623 will be engaged. The total lever is fulcrumed upon a stud 706 fixed on an arm of a T-lever 707 (Figs. 5, 10 and 11), and a flexible lever 398 is also fulcrumed upon the same stud and provided with spring connection 399 with the total lever 705. Engagement of a lug of lever 705 by lever 398 provides that the two levers may act in unison. Lever 398 is provided with a notch 714 adapted to engage a bail 400 (see also Fig. 7), which is normally coupled (by means hereinafter described) to a rocker 643, pivoted on shaft 636 and having a forked lower end provided with rollers engaging the total cams 645, fast upon the driven member of clutch 623. Rotation of the cams 645 shifts the levers 398 and 705 forwardly, the tooth 720 moving beneath the bar 687 to maintain the levers in set position if the total key is immediately released.

The rearwardly extending arm of T-lever 707 forms part of a rocker frame supporting trains of pendant gears 716 (Figs. 2 and 8) meshing with the output gears 201 of the differential actuators, these gears being moved into mesh with the frictionally driven pinions 606 during the first half rotation of clutch 623, as determined by the cams 645.

A spring centralizer 721 (Fig. 5) normally holds gears 716 out of mesh with the pinions 606, while pinions 717 secured to the ends of the shaft at the rear of the pendant gear frame engage fixed racks 718, providing for parallel movement of the frame. As shown in the previous applications Serial No. 366,261 and No. 176,156, both input legs of the planetary differential actuator are normally locked whenever the arms 42, 43 and 44 (Fig. 4) are in their normal position, as they are in total and sub-total taking. It is, therefore, necessary to unlock one of these input legs to permit the output gear 201 to rotate during the transfer of a value from the product register 473 to the storage wheels 382. To accomplish this, the movement of gears 716 into mesh effects the lifting of detents 64 (Fig. 2) from the gears of the pendant train 203 of the differential actuator.

The forwardly extending arm of T-lever 707 is curved upwardly to underlie the zero stop bar 719 (Fig. 5), which is provided with projections adapted to be brought into the path of movement of zero pins 487 fixed in the numeral wheel register 473. Thus, racks 381 being driven rearwardly during the first half revolution of clutch 623, operated in response to the depression of total key 700, the numeral wheels of register 473 will be driven subtractively until stopped by engagement of the zero pins 487 with the projections of stop bar 719, whereupon the frictional elements of the drive will slip. This operation will drive the racks 613 and in case listing mechanism is provided will thereby set the type bars to represent the total taken from the product register. If key 387 is held depressed during the operation, the racks 381 will transfer the value from register 473 to the storage wheels 382.

The sub-total key 701 acts in the same manner as total key 700, except that rocker bail 400 is uncoupled from rocker 643 and is coupled with rocker 676 (Fig. 11), so that the cams 674 will hold the numeral wheels of register 473 entrained with racks 613 throughout the cycle of clutch 623, adding back the value into the register after it has been printed or simultaneously with the storage thereof in wheels 382.

Sub-total key 701 acts to depress levers 705s and 398s (Figs. 8 and 11), corresponding to the identical levers related to the total key. The lug of the sub-total key also engages and acts to depress a coupling lever 401 (Figs. 7, 11 and 12). Lever 401 has a slot engaging the bail 400, and fulcrums at its rearward end upon the stud 706 of T-lever 707, the slotted engagement with the stud preventing direct operation of lever 707 by lever 401. A stud 402 of lever 401 normally lies between opposed lugs of the rocker 643, as seen in Figs. 7 and 10. A second stud 403 of said lever overlies a slot formed in the upper end of rocker 676. Upon depression of key 701 stud 402 will be moved out of register with the opposed lugs of rocker 643 and stud 403 will be moved into engagement with the slot of rocker 676, thereby breaking the connection of bail 400 with cams 645 and establishing the connection thereof with cams 674. The engagement of notch 714 of lever 398s with rocker 400 connects T-lever 707 with the rocker, providing for the engagement of gears 716 with pinions 606 throughout the cycle of a sub-total operation.

When the "To storage" key 387 is depressed during a sub-totaling operation, it will be obvious that the cams 395 will engage the storage wheels during the last half of the cycle, whereby the value standing in register 473 will be turned into the storage wheels 382, precisely as in totaling operations. Means are also provided whereby the total and sub-total keys may be thrown out of operative relation with the product register 473, and into relation with another register of the machine, providing for the transfer of a value from another register to the storage wheels 382, as will be explained in the description of the "from" keys under the sub-heading "Clearing and transferring values from storage."

*Clearing and transferring values from storage*

For removing values from the storage wheels 382, a "From storage" key 404 is provided (Figs. 1, 7, 8 and 9). The stem of this key having a cam notch in which a pin of crank arm 405 is normally seated. Arm 405 is fixed upon a rock shaft 406, upon which shaft catches 407 (Figs. 10 and 11) are also fixed. A spring 408 normally holds the pin of arm 405 in the cam notch of the key stem, and upon depression of key 404 shaft 406 will be rocked, bringing the catches 407 beneath lugs formed in the forward ends of levers 398 and 398s. In this position of the parts, depression of the total or sub-total key will not engage levers 398 or 398s with the rocker 400, the spring connection between levers 398 and 705 or 398s and 705s yielding under pressure of the key. The total or tub-total key will, however, operate bail 710 and engage clutch 623. Thus depression of the total or sub-total key, with the "From storage" key depressed, will have no effect upon the product register.

The lug of key 404 overlies the "From storage" lever 389, and depression of the key acts to bring a notch 409 of said lever into register with the rocker 400. It has been seen that rocker 400 is coupled with the rocker 643 or 676, in accordance with the depression of the total or sub-total key respectively. The "From storage" lever 389, like the "To storage" lever 388, is connected with bell crank lever 390, so that depression of the total key will cause the gears 384 of the storage wheels to be engaged with the gears 385 during the subtractive stroke of the racks 381, while depression of the sub-total key will maintain these gears in engagement throughout the operation of clutch 623.

Permanent stops (Figs. 2 and 8) formed on the plate 410 of the pendant gears lie in the paths of movement of zero pins 411 of the storage wheels, and provide for the clearing of these wheels when the "From storage" and total keys are depressed. It may be noted that the wheels never pass through 9½ position in either direction of rotation.

It is intended that values may be transferred from the storage wheels into one or more registers of the machine, through the operation of racks 381 and 613. As an example, gears 412 (Fig. 2) represent an auxiliary register which may be operated from racks 613, so that values will be entered therein by setting the "From storage" key and a "to" key for that register, and then depressing the total or sub-total key.

Figure 1:
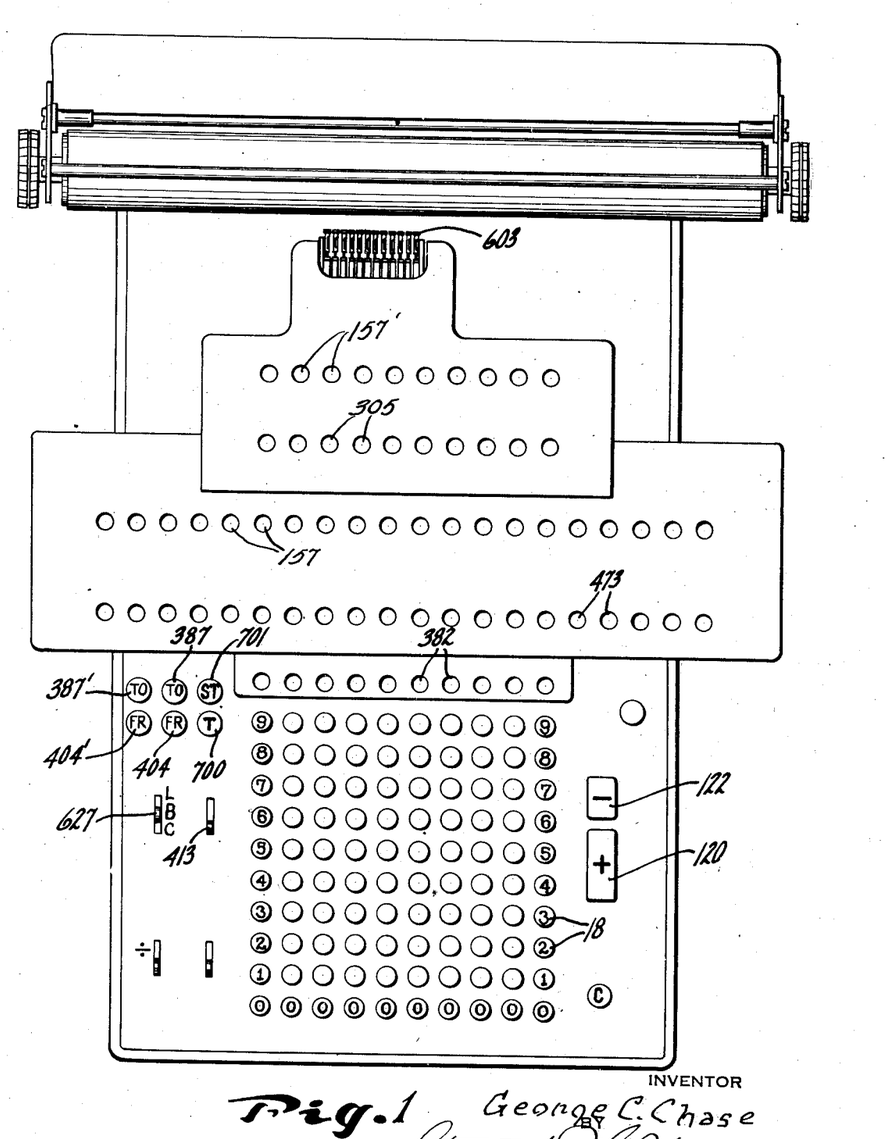
Figure 1 is a plan view of a calculating machine embodying the invention.

A "to" key for the auxiliary register 412 is illustrated at 387', Figs. 1, 7 and 8. An auxiliary register from key 404' is also provided for clearing the auxiliary register to zero in conjunction with operation of the total key, or for transferring a value to the storage wheels 382 by setting said "from" key, "To storage" key 387, and depressing the total or sub-total key. Obviously several auxiliary registers such as 412 may be provided, with a "from" and "to" key for each, and a value may be simultaneously transferred into several registers by the simultaneous setting of several "to" keys, in conjunction with the setting of a "from" key related to another register, and the depression of the total or sub-total key. These "from" and "to" keys control the register to which they are related in the same manner as the storage wheels are controlled from the keys 404 and 387, and it will, therefore, be unnecessary to show the control mechanism.

*The storage register as a value entering control*

Means are provided whereby the storage wheels may assume control of the means for entering values into the calculating and/or the listing and transfer mechanism, whereby a stored value may control registration in the product register and may be printed or accumulated in any other register of the machine.

For this purpose a setting lever 413 (Figs. 1 and 5) is freely mounted upon shaft 414, the lower end of this lever having cam engagement with a pin fixed in a lever 712 overlying an arm of the keyboard clearing bail 58. Bail 58 engages projecting portions of the known key locking slide, as indicated in Fig. 2. Thus, so long as lever 413 remains in its rearward position, the keys 18 will not be latched down, and will be held in inoperative position by their springs.

As lever 413 is moved rearwardly, a cam slot 415 formed in a rearward arm of said lever will act upon a stud fixed in a link 416, which has a slot engagement with the shaft 414 and pivotal connection with one of the arms 383 of the frame which supports the storage pendant train. Therefore, operation of lever 413 will rock the pendant frame clockwise about shaft 386, until at the end of the setting movement the stud of link 416 will seat in an offset extension of the cam slot 415 which serves to hold lever 413 in set position against the tension of the springs of slides 46, 48, 50 and 52 (to be explained later). The slot in link 416 and the space between the jaws of arm 383 provide for lost motion in the setting of the storage pendant trains, so that these trains may be set forwardly by lever 413 or rearwardly by bell crank lever 390.

When the pendant trains are set forwardly or clockwise about shaft 386 the detents 396 remain in engagement between the teeth of the gears 384, preventing rotation of the storage wheels.

As shown in Fig. 2 and Figs. 14 to 19 inclusive, each outermost gear of the trains 384 has fast thereto a series of six storage plates or disk segments numbered 417 to 422 inclusive. Disk 417 has five segmental teeth, one or another of said teeth being adapted to contact with a spur 423 of the —1 slide 46, when the related storage wheel stands at 1, 3, 5, 7 or 9 and the disk segments are carried forward by the setting lever 413. In this setting movement, therefore, slide 46 will be moved forwardly, setting —1 in the related differential actuator unit. Disk 418 has a single segmental portion, which will be brought opposite the spur 423 of the ±4 slide 48 when the related storage wheel stands at 5 or 6, the setting action in this case moving slide 48 forwardly to provide for an actuator setting of —4. Disk 419 has a similar segmental portion corresponding to the 3 and 4 positions of the related register wheel, the segment being set opposite the end of a reversing lever 424, pivotally mounted upon slide 48 and taking a fulcrum upon shaft 638 to move the slide rearwardly and set +4 into the actuator unit. The segmental portion of disk 420 represents a setting of 1 or 2 in the related storage wheel and cooperates with a reversing lever 424 of the ±2 slide 50, operating to move said slide rearwardly and set +2 in the actuator. The segmental portion of disk 421 represents a storage wheel setting of 7 or 8, and cooperates with the spur 423 of the slide 50, to move said slide forwardly and set —2 in the actuator. Disk 422 has a semi-circular segmental portion representing a storage wheel setting of 5, 6, 7, 8 or 9, and cooperates with a reversing lever 424 to move slide 52 rearwardly and set +1 in the actuator unit of next higher order. The stop rod 397 holds the reversing levers 424 away from the disk segments when the pendant trains stand in their intermediate neutral or in the rearward position.

Of course, this setting of the slides not only sets the differential actuators but also sets the stop links 373, 374 and 375. Consequently, movement of the control lever 627 into "calculate only," "calculate and list" or "list only" position will provide, in connection with the setting of lever 413 to active position, for calculating with the stored value as a factor; for listing and/or transferring that factor to another register incidentally to the calculation, or for merely listing and/or transferring that factor to another register. As previously explained, a value stored in the wheels 382 may also be listed and/or transferred to another register through the racks 381, either clearing the wheels to zero or retaining the value in the wheels, or the wheels may be merely cleared to zero, with the lever 413 in its normal position.

*Use of storage and transfer devices*

The present invention is intended for use in a four rules calculating machine equipped with means for printing both factors and the result of a calculation, and for printing items and totals. The embodiment of the invention herein disclosed is designed for use in connection with the mechanisms disclosed in the following co-pending applications:

Serial No. 285,860, filed July 22, 1939, and Serial No. 366,261, filed November 19, 1940, and in the following patents issued upon co-pending applications: No. 2,265,628, issued December 9, 1941; No. 2,273,251, issued February 17, 1942; No. 2,278,863, issued April 7, 1942; and No. 2,309,240, issued January 26, 1943.

Figure 20:
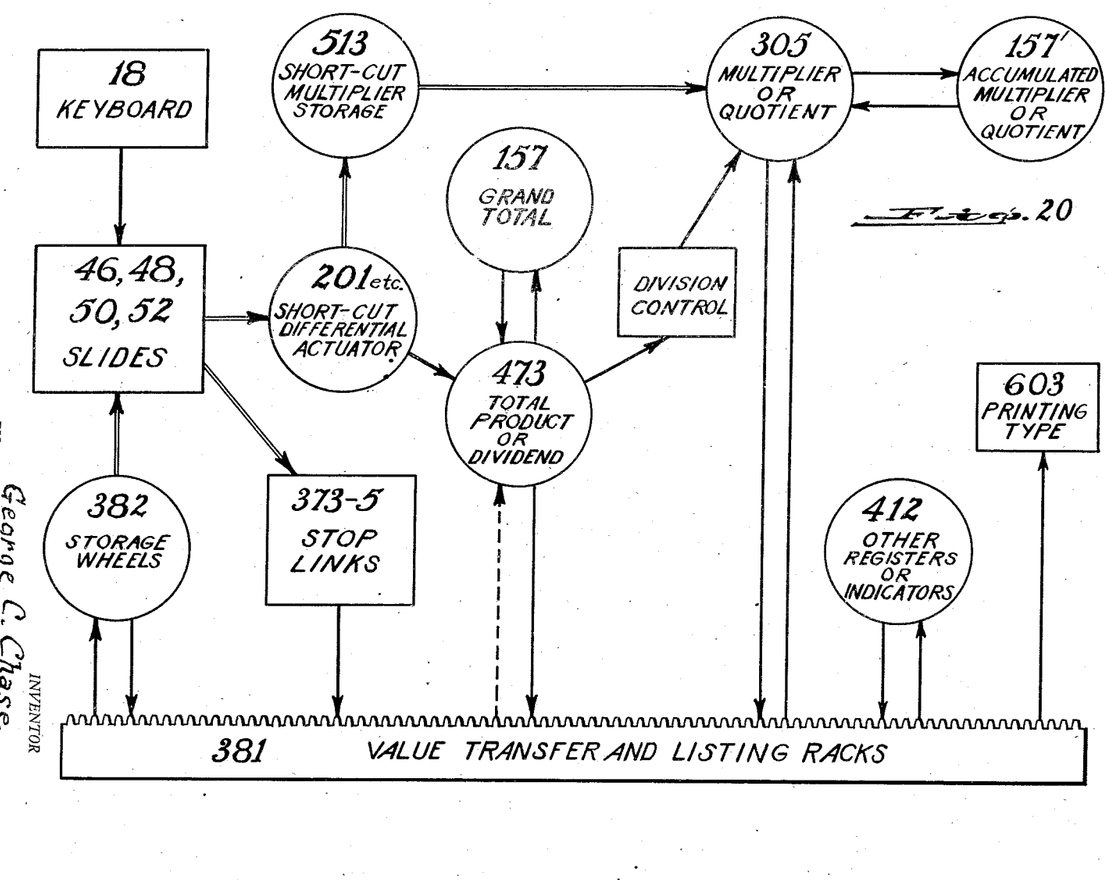
Fig. 20 is a diagram showing the relation of the storage wheels to the other value disposal means of a listing calculator.

Fig. 20 illustrates diagrammatically the relation of the different value retaining means of the machine and the various transfers of value which may be effected.

The numbers designating the several units illustrated in Fig. 20 conform with the numbers used in this and in the above mentioned applications to designate corresponding parts. Thus, numeral 157 designates a grand total register related to the product register 473, provided with means for accumulating totals from the last-named register and for returning the accumulated or grand total values to register 473, from which they may be transferred to any other value holding unit, or printed. Values may be transferred from any point in the machine to the product register 473 through the differential actuators 201, but obviously such values might be transferred directly to said registers through racks 381, this being indicated on the diagram by a dotted line arrow.

Numeral 513 designates a set of storage wheels which may be set to represent a semi-complemental value, these wheels controlling the cycling of the machine in multiplication according to the well known shortcut method, the multiplier being registered on wheels 305, which also serve to register a quotient in division. Multipliers or quotients may be accumulated in a register 157', having the same relation to wheels 305 as the grand total register 157 has to the product register 473. In the diagram double line arrows represent values which are transferred semi-complementally, for shortcutting purposes, while single line arrows represent values which are transferred normally.

It will be seen from inspection of Fig. 20 that any value entered into the machine, or computed within the machine by any operation whatsoever, may be transferred to any value holding unit of the machine excepting back to the keyboard, the latter transfer being without purpose since the storage wheels 382 serve every purpose which could be accomplished by transferring values back to the keyboard. Furthermore, every entered or computed value may be transmitted to the type for printing, in most cases as an incident to some other operation.

It is to be particularly noted that the storage wheels 382 establish four closed circuits in a listing-calculator, providing for the computation and printing of intricate mathematical tables and for the solution of intricate algebraic formulas wherein an accumulation attained in one or more calculations becomes a factor of the next, for example:

(1) A product (or grand total transmitted back to the product register) may be transferred to the storage wheels concurrently with its printing, from which wheels it may be taken as a new factor for the next calculating and listing operation of the series, which may be any one of or a combination of several basic four rules operations.

(2) A quotient (or accumulated quotient) may be used in the same manner.

(3) Multiplicand, dividend or divisor values, etc., may be accumulated in the auxiliary register and subsequently transferred to the storage wheels to be used as a new factor.

(4) A multiplier may be transferred to one of the other registers (412) concurrently with a printing operation, whereupon any predetermined value may be added to or subtracted from said multiplier value, now in register 412, and the new value transmitted to the storage register and there used as a factor of the next calculating and listing operation of the series.

It is further of note that while certain units illustrated in Fig. 20 register values in terms of shortcut digitation and other units register them normally, there is no restriction imposed upon the transfer of values from any unit to any other unit (including the printing mechanism) by the conversion to and from shortcut digitation.

According to the disclosure of Patent No. 2,309,240 above referred to, it was necessary to set the multiplier into the keyboard and store it in the multiplier controlling wheels 513 before setting the multiplicand into the keyboard. In certain classes of work, such as billing, it is desirable to print the multiplicand before printing the multiplier, and inasmuch as it is preferable to use the factor requiring the fewer machine cycles as the multiplier, there is an advantage in installing the multiplicand first. The storage wheels provide for this alternative installation of both factors through the same keyboard. The multiplicand is set into the keys 18, and transferred to the storage wheels 382, after which the multiplier is set into the keyboard and turned into the wheels 513 as described in said previous application. The lever 413 is then pushed rearwardly, clearing the keyboard, and engaging the storage wheels to serve as a multiplicand control. The calculation is completed by depressing the "multiplication" motor key, which is also described in said previous application. The multiplicand and the multiplier are printed as they are transferred from the keyboard.

I claim:

1. In a calculating machine having value entering devices, calculating means including a register, differential actuators therefor settable under control of said entering devices, devices adjustable to represent values to be retained, reciprocatory racks operable under control of the value entering devices, drive means for said differential actuators and racks, and means cooperating with the racks to clear the register and including a total key, normally disengaged column latches for said racks, devices operable by the drive means to effect yieldable movement of the column latches to engaging position, said column latches being engageable each with a related value entering device to prevent latching of the racks, and means adjustable by the total key to disable said column latches.

2. In a calculating machine having value discriminating members, calculating means including a register, differential actuators therefor, connections settable under control of the discriminating members to enter a value in the differential actuators, devices adjustable to represent values to be retained, reciprocatory racks operable under control of the value entering devices to adjust said devices differentially, and drive means for said differential actuators and racks; normally disengaged column latches for said racks, and devices operable by the drive means to effect yieldable movement of the column latches to engaging position, said column latches being engageable each with a related set actuator connection to prevent latching of the rack.

3. In a calculating machine having settable value entering devices, value signifying means, reciprocatory actuators therefor differentially operable under control of the value entering devices, and drive means for said actuators; normally disengaged column latches for said actuators, and devices operable by the drive means to effect yieldable movement of the column latches to engaging position, said column latches being engageable each with a related set value entering device to prevent latching of the actuator.

4. In a listing calculator having a register provided with numeral wheels, rotary differential actuators therefor, and printing means including reciprocatory listing racks; means normally disengaged from and settable by the racks to control the differential action of said actuators, means for connecting the control means with the racks, and means operable to control the movement of said racks in accordance with values registered in the numeral wheels.

5. In a listing calculator having a register, provided with numeral wheels, calculating means including differential actuators for said wheels and drive means for said actuators, and printing means including reciprocatory listing racks and drive means for said racks; normally disengaged means for rotatably connecting the numeral wheels with the racks, means normally disengaged from and settable by the racks to control the differential action of said actuators, means for connecting the control means with the racks, and means operable to remove the numeral wheels from the control of said calculating means and connect said wheels with the type bars through the normally disengaged connecting means.

6. In a listing calculator having a register, settable differential registration control elements therefor, and reciprocatory racks associated with said register and said control elements; storage devices including each rotatably settable plates designed to set the related control elements, a gear fast with said plates, and normally disengaged from the related rack, and a zero stop mounted in fixed relation to the axis of said plates, and means for selectively moving said plates to mesh the gear with said rack during the progressive or alternatively during the regressive movement of the racks.

7. In a listing calculator having printing means including reciprocatory listing racks; the combination with value entering means comprising digit setting keys, a plurality of elements related to each rack and settable singly or in combination upon depression of a single selected key, and rack engaging stops individual to and settable by said elements to control differential arithmetically progressive movements of said racks, of value representing devices comprising each part digit plates settable by said racks under control of the value entering means to represent certain digits by normal or alternatively other digits by complemental values.

8. In a listing calculator having a register, rotary differential actuators therefor including in each denominational order elements settable singly or in combination, and printing means including reciprocatory listing racks controlled by one or more of said actuator elements; value storage plates designed to retain values during independent operation of said actuators and racks, and means cooperating with the storage plates to set the actuator elements singly or in combination and thereby control the racks in accordance with values standing in said plates.

9. In a calculating machine having a register, settable differential actuators therefor and drive means for said actuators; bodily adjustable differentially settable storage devices designed to retain values during independent operation of said actuators and operable to set the actuators differentially, means operable by the drive means to lock the actuators as set, and means to adjust the storage devices bodily out of actuator setting position.

10. In a listing calculator having a register, cyclic differential actuators therefor, lister racks, and means operable to effect plural cycle operation of the differential actuators and a concomitant single operation of the lister racks; value storage wheels, value entry means controlled by said storage wheels including members adjustable to set the actuators differentially and to limit the extent of movement of the listing racks, and column latches conditioned by the setting members for selective restraint of said racks.

11. In a listing calculator having a register, cyclic differential actuators therefor, lister racks, and means operable to effect plural cycle operation of the differential actuators and a concomitant single cycle operation of the lister racks; value storage wheels, value entry means controlled by said storage wheels including members adjustable to set the actuators differentially and to limit the extent of movement of the listing racks, normally inactive column latches conditioned by the setting of values into the entry means for selective operation, and means for engaging the designated latches with their related racks.

12. In a calculating machine having a register, a denominational series of differential actuators therefor settable for complemental registration, and lister racks provided with stop shoulders and operable differentially by graduated movements in a single direction; value entering means including elements movable to set digital complemental values in the related actuators, elements movable to set units in the actuators of next higher denomination, and stop elements connected with the complemental value setting elements and settable thereby into the paths of movement of the stop shoulders to limit movement of the racks, a shiftable frame, series of value storage devices mounted upon said frame and including plates related respectively to the complemental value and to the unit setting elements, and means settable to shift the frame to bring the value storage plates into contact with the related setting elements to set the actuators and stops in accordance with stored values.

13. In a calculating machine having a register, and lister racks provided with stop shoulders; stop elements having an opposed relation to and settable differentially into the paths of movement of said stop shoulders, a shiftable frame, value storage plates adjustably mounted on said frame and provided with steps of uniform projection, slides operable to set the stop elements and having shoulders lying in the paths of shifting movement of certain of said stepped plates, a fixed abutment, reversing levers connected to said slides, lying in the paths of shifting movement of other of said stepped plates and engageable with the abutment, and means for shifting the frame to move the slides each alternatively in one or in the other direction in accordance with the adjusted position of the stepped plates, to set the stop shoulders differentially.

14. In a calculating machine having a register, and differential actuators therefor; a shiftable frame, stepped value storage plates adjustably mounted on said frame, slides having connection with the differential actuators and shoulders lying in the paths of shifting movement of certain of said stepped plates, a fixed abutment, reversing levers connected to said slides, lying in the paths of shifting movement of other of said stepped plates and engageable with the abutment, drive means including oppositely disposed gears, and means for shifting the frame to move the slides each alternatively in one or in the other direction in accordance with the adjusted positions of the stepped plates, to engage the differential actuators each alternatively with one or with the other of said oppositely disposed drive gears.

15. In a calculating machine having a register, settable differential actuators therefor, and means for differentially setting said actuators; a shiftable frame, settable stepped value storage plates on said frame shiftable therewith in one direction from neutral position to engage the plates with the actuator setting means and set the differential actuators in accordance with stored values or alternatively shiftable in the opposite direction to plate setting position, locking means for said plates comprising spring pawls mounted on the shiftable frame and engaging the plates in the neutral and in the actuator setting positions of the frame, and a stationary abutment engageable by the pawls in the movement of the frame to plate setting position and acting to disengage said pawls from the plates.

16. In a calculating machine having a register, differential actuators therefor; and lister racks provided with stop shoulders; value entering means including series of elements each series comprising a negative unit value element and cooperating positive and negative value elements movable singly or in combination each to set a given value in the actuator for additive or alternatively for subtractive registration, stops settable by the value setting elements into the paths of movement of the racks and cooperating with the stop shoulders thereof to determine normal or alternatively complemental value movements of the racks in a single direction, and devices settable by the negative unit value setting elements and settable thereby to modify the limiting action of the stop elements and determine one less step of rack movement.

17. In a calculating machine having a register, differential actuators therefor comprising each independently settable elements each operable singly or in combination with the other elements to effect additive or alternatively subtractive registration in accordance with the decimal system, and lister racks provided with stop shoulders; value entering means including series of elements, each series comprising three elements movable to set the elements of the related differential actuator to register ±2, ±4 and −1, respectively, stops connected with the ±2 and the ±4 setting elements and settable thereby into the paths of movement of the racks to determine settings thereof of +2, +8 and +4, +6 steps of movement, respectively, and devices connected with the 1 setting elements and settable thereby to modify the limiting action of the stop elements and determine one less step of rack movement.

GEORGE C. CHASE.